United States Patent
Imanishi et al.

(10) Patent No.: US 6,789,919 B2
(45) Date of Patent: Sep. 14, 2004

(54) CIRCULAR FLUORESCENT LAMP UNIT AND LIGHTING APPARATUS

(75) Inventors: Otokazu Imanishi, Tokyo (JP); Shuji Yamamura, Tokyo (JP); Hiroyuki Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/124,278

(22) Filed: Apr. 18, 2002

(65) Prior Publication Data

US 2002/0196621 A1 Dec. 26, 2002

(30) Foreign Application Priority Data

Apr. 25, 2001 (JP) ......................................... 2001-127815

(51) Int. Cl.[7] ................................................ F21V 7/10
(52) U.S. Cl. ........................ 362/216; 313/573; 313/634
(58) Field of Search ................................ 313/485, 493, 313/573, 577, 634; 362/216, 485, 493, 573, 577, 634

(56) References Cited

U.S. PATENT DOCUMENTS

| | | | | |
|---|---|---|---|---|
| 4,121,132 A | * | 10/1978 | Repsher | 313/486 |
| 4,409,521 A | * | 10/1983 | Roberts | 315/57 |
| 5,034,655 A | * | 7/1991 | Murayama et al. | 313/493 |
| 5,105,118 A | * | 4/1992 | Shinada et al. | 313/51 |
| 5,124,618 A | * | 6/1992 | Ohtaka et al. | 313/489 |
| 5,789,849 A | * | 8/1998 | Porembski et al. | 313/318.02 |
| 5,796,210 A | * | 8/1998 | Sakakibara et al. | 313/493 |
| 5,951,145 A | * | 9/1999 | Iwasaki et al. | 362/216 |
| 6,043,600 A | * | 3/2000 | Sica | 313/493 |
| 6,193,390 B1 | * | 2/2001 | Sakakibara et al. | 362/216 |
| 6,552,489 B2 | * | 4/2003 | Sakakibara | 313/636 |

FOREIGN PATENT DOCUMENTS

| | | |
|---|---|---|
| JP | 56-48058 | 5/1981 |
| JP | 56-71268 | 6/1981 |
| JP | 3-108251 | 5/1991 |
| JP | 4-262360 | 9/1992 |
| JP | 8-273607 | 10/1996 |
| JP | 9-320526 | 12/1997 |
| JP | 2000-149870 | 5/2000 |

* cited by examiner

*Primary Examiner*—Thomas M. Sember
*Assistant Examiner*—Jacob Y. Choi
(74) *Attorney, Agent, or Firm*—Whitham, Curtis & Christofferson P.C.

(57) ABSTRACT

In a circular fluorescent lamp unit comprising: a glass bulb 1 which is bent into a ring shape with both ends abutting on each other, has phosphor powder coated on an inner wall thereof, has electrodes provided at the respective ends in an inner space thereof and has mercury and inert gas sealed therein; and a cap which has connection pins used for electrically connecting the electrodes in the glass bulb with the outside and is attached so as to cut across the both ends of the glass bulb, a tube outer diameter of the glass bulb 1 is 13 mm to 20 mm, a ring outer diameter of the ring is 145 mm to 170 mm, lamp wattage is not more than 20 W, and lighting is carried out with a high frequency which is not less than 10 kHz.

5 Claims, 3 Drawing Sheets

CIRCULAR FLUORESCENT LAMP UNIT AND LIGHTING APPARATUS

BACKGROUND OF THE INVENTION

1. Field of the Invention

The present invention relates to a circular fluorescent lamp unit and a lighting apparatus, and more particularly to a circular fluorescent lamp unit, which uses small wattage and is suitable for illumination in a relatively narrow place and a lighting apparatus using this circular fluorescent lamp unit.

2. Description of the Prior Art

For example, in a relatively large place such as a lobby in a hotel or an exhibition room in an art gallery or a museum, it is often the case that a down light unit from a ceiling fixture type lighting apparatus is used as accent illumination in addition to main illumination which illuminates a wide range in order to produce the atmosphere appropriate for that place. Furthermore, the down light unit is used in general dwelling as the main illumination in a relatively narrow place such as an entrance, a hallway, stairs or a lavatory or as auxiliary illumination in, e.g., a living room. As a light source of such a down light unit, a compact fluorescent lamp unit, a krypton lamp unit or an in candescent lamp unit including a light bulb have been conventionally often used. That is because a lighting apparatus with the higher energy consumption efficiency is demanded in addition to the necessity of reduction in size.

FIG. 1 is a side cross-sectional view showing a lighting apparatus using a compact fluorescent lamp unit as a light source being embedded in a ceiling. Referring to FIG. 1, the compact fluorescent lamp unit 21 is a commercially available compact fluorescent lamp unit (FDL18EX-N: lamp wattage 18 W), and this is a lamp unit obtained by joining two superposed glass bulbs having a tube outer diameter d=16.5 mm which are bent in the U shape as shown in Table 1. A cap 23 is attached to the lamp unit 21, and the lamp unit is held in a lighting apparatus 30 by this cap 23 and also electrically connected to the lighting apparatus 30. The lighting apparatus 30 is constituted by a portion with a U-shaped cross section consisting of a bottom portion 34 to which a non-illustrated socket which bears the cap 23 of the lamp unit is provided and a portion 35 for accommodating the lamp unit therein, and a conical trapezoidal light reflector 33 which downwardly opens from the lamp accommodation portion 35 toward a ceiling surface 100, and a lamp lighting circuit 31 is provided to the outside of the bottom portion 34.

In the above-described compact fluorescent lamp unit, the lamp unit 21 has a length L (distance from the bottom of the apparatus 30 to the top of the lamp unit 21) of 129 mm and an outer diameter (width of the glass bulb portion in the horizontal direction) D3 of 39 mm. Furthermore, when viewing the entire system including the lighting apparatus, a diameter D4 of the opening of the ceiling surface is 170 mm, and an attachment depth t is 175 mm. Incidentally, although not shown in particular, when a krypton lamp unit (for example, LDS100/110V57W-C-K) is used, the structure of the lighting apparatus is substantially the same as the shape of the apparatus using the compact fluorescent lamp unit.

In recent years, aging in society advances, bright illumination is demanded, and the needs for illumination with the high luminous flux in the entire living space are increasing. Moreover, the possibility of being attached in a narrower space is also demanded. In addition, improvement in the efficiency (ratio of light output/input wattage) is essential to a new commercial product in order to cope with a socially important and urgent problem, namely, energy saving.

SUMMARY OF THE INVENTION

It is, therefore, an object of the present invention to provide a fluorescent lamp unit which has the higher light flux and higher efficiency than those of a conventional down light unit such as a compact fluorescent lamp unit or a krypton lamp unit and can be attached in a narrower space, and a lighting apparatus using this fluorescent lamp unit.

In a circular fluorescent lamp unit according to the present invention, a glass bulb is bent in the ring form with both ends abutting on each other. The inner wall of the glass bulb is coated with phosphor powder, and electrodes are provided at respective ends in an inner space thereof. Mercury and inert gas are sealed within the glass bulb, and a cap which has a connection pin used for electrically connecting the electrodes in the glass bulb to the outside is attached so as to cut across the both ends of the glass bulb. A tube outer diameter of the glass bulb has a range of 13 mm to 20 mm and a ring outer diameter of the ring has a range of 145 mm to 170 mm.

Additionally, according to the present invention, there is provided a lighting apparatus, which uses the above-described circular fluorescent lamp.

DETAILED DESCRIPTION OF THE PREFERRED EMBODIMENTS

Figure 2:
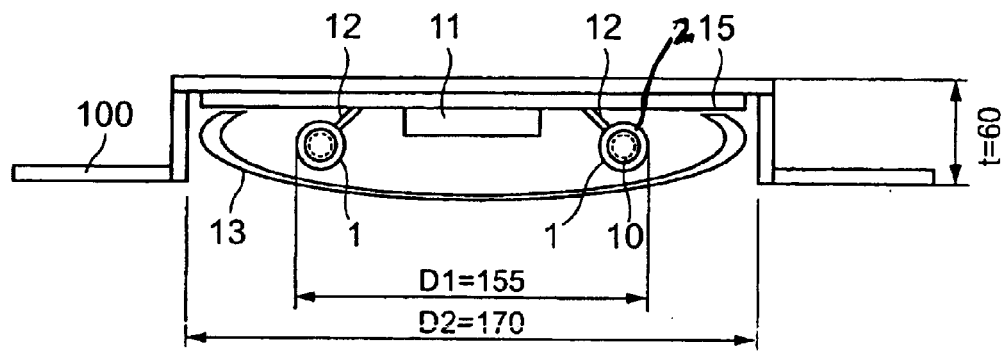
FIG. 2 is a cross-sectional view showing a side cross section of a lighting apparatus according to an embodiment of the present invention being embedded in a ceiling.

An embodiment according the present invention will now be described with reference to the accompanying drawings. FIG. 2 is a side cross-sectional view showing a lighting apparatus according to an embodiment of the present invention being embedded in a ceiling. Referring to FIG. 2, the fluoresent lamp unit according to this embodiment is a circular fluorescent lamp unit having lamp wattage of 18 W, and fluorescent lamp unit 1 having a glass bulb being bent in in the ring form is used as this fluorescent lamp unit. A layer of tri-phosphor powder 10 is formed on me inner wall in the glass bulb 2.

Figure 3:
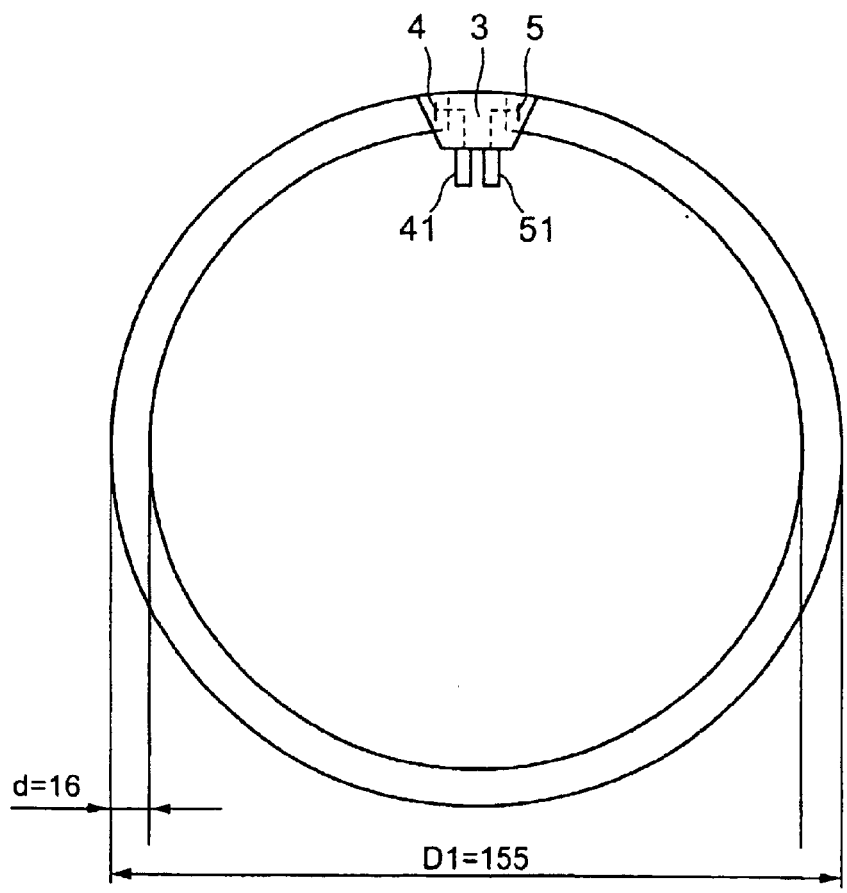
FIG. 3 is a plane view showing a circular fluorescent lamp unit according to the embodiment of the present invention.

There is used the circular fluorescent lamp unit 1 obtained by bending a single tube circular glass bulb (tube outer diameter d=16 mm. See Table 1) into a ring so that the both ends abut on each other as shown in FIG. 3, and a ring outer diameter D1 of the ring=155 mm. As similar to a commercially available circular fluorescent lamp unit having a tube outer diameter of 26 mm to 29 mm (for example, FCL15EX-N: see Table 1). Electrodes 4 and 5 for discharge are provided at both end portions covered by a cap 3, and inert gas including mercury is sealed in the glass bulb 2. The cap 3 is attached to a portion where the outer both ends of the glass bulb 2 abut on each other so as to cut across the opposed end portions of the glass bulb, and metal connection pins 41 and 51 provided to the cap 3 are electrically connected to the electrodes 4 and 5, respectively, in the glass bulb. Thus, lighting is performed with a high-frequency voltage not less than 10 kHz from an outside lamp lighting circuit through the connection pins 41 and 51.

A lamp lighting circuit 11 is provided to a base 15 of the lighting apparatus at a portion corresponding to the inner side of the ring shape of the fluorescent lamp unit 1. A lamp holder 12 for holding the fluorescent lamp unit is also attached to the base 15. Furthermore, although not shown, a socket that is connected to the cap 3 of the lamp unit 1 is provided. As shown in FIG. 2, the above-described circular fluorescent lamp unit 1 is held in the lamp holder 12 provided to the base 15 of the lighting apparatus so as to be capable of being replaced, and electrically connected by the socket on the apparatus side and the cap 3 on the lamp side. Moreover, a shade 13 is attached to the base 15 so as to cover all of the circular fluorescent lamp unit 1, the lighting circuit 11 or the like.

Table 1 shows a circular fluorescent lamp unit having lamp wattage of 18 W according to this embodiment, a prior art compact fluorescent lamp unit having the same lamp wattage (FDL18EX-N as an example) and a prior art circular fluorescent lamp unit having a ring outer diameter closest to that of this embodiment (FCL15EX-N as an example) by comparing the wattage, the light flux and the efficiency in the lamp unit itself (the lamp wattage, the lamp light flux and the lamp efficiency, respectively) and the wattage consumption and the efficiency as the entire lighting apparatus having the lamp unit attached thereto (the system wattage consumption and the system efficiency, respectively). Moreover, the shapes of the lamps and the attachment dimensions when embedded in a ceiling as the lighting apparatus are compared in this table. It is to be noted that each wattage, light flux and efficiency mentioned above are all values when the ambient temperature is 25° C., the lamp efficiency is defined as the lamp light flux/lamp wattage and the system efficiency is defined as the lamp light flux/system wattage consumption.

TABLE 1

| | | | | Prior Art | |
|---|---|---|---|---|---|
| | | | Embodiment | Circular (FCL15EX-N) | Compact (FDL18EX-N) |
| Electrical Characteristics | Lamp Wattage (W) | | 18 | 15 | 18 |
| | Lamp Light Flux (1 m) | | 1220 | 660 | 1100 |
| | Lamp Efficiency (1 m/w) | | 67.8 | 44 | 59 |
| | System Wattage Consumption (W) | | 20 | 19 | 21.5 |
| | System Efficiency (1 m/W) | | 61 | 34.7 | 51.2 |
| Structure | Lamp | Tube Outer Diameter d (mm) | 16.0 | 26.0 | 16.5 |
| | | Ring Outer Diameter D1 (mm) | 155 | 170 | — |
| | | Outer Diameter D3 (mm) | — | — | 39 |
| | | Length L (mm) | — | — | 129 |
| | Lighting Apparatus | Attachment Opening Diameter D2, D4 (mm) | 170 | 255 | 170 |
| | | Attachment Depth (mm) | 60 | 114 | 175 |

Figure 1:
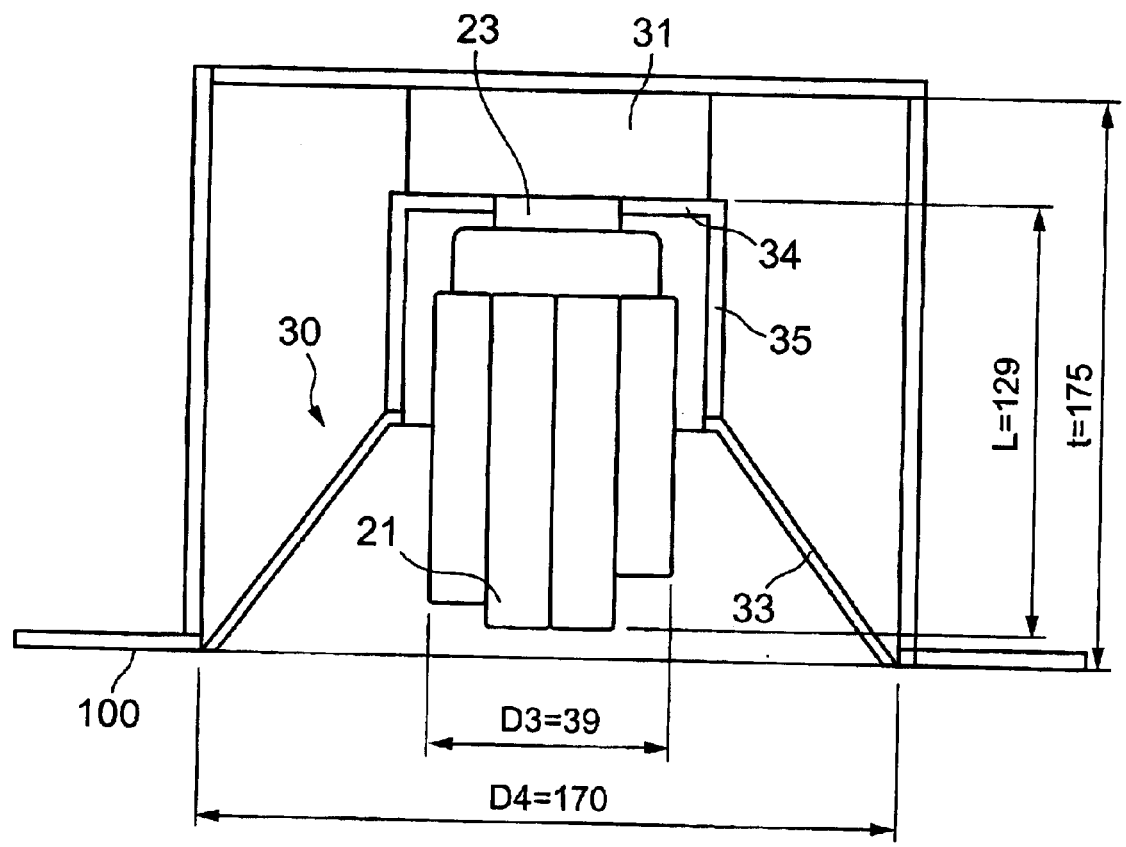
FIG. 1 is a side cross-sectional view showing a lighting apparatus using a prior art compact fluorescent lamp unit as a light source being embedded in a ceiling.

Referring to Table 1, in terms of the attachment dimension including the lighting apparatus, the diameter of the opening for attachment is 170 in case of the fluorescent lamp unit according to this embodiment (D2: see FIG. 2), and the prior art compact fluorescent lamp unit (D4) has that diameter of 170 mm. In case of the compact fluorescent lamp unit, the outer diameter D3 of the lamp unit itself is 39 mm which is approximately ¼ of the ring outer diameter D1=155 mm of the fluorescent lamp unit according to this embodiment. That is because the compact fluorescent lamp unit requires a light reflector 33 (see FIG. 1) in order to widen the light distribution.

Figure 4:
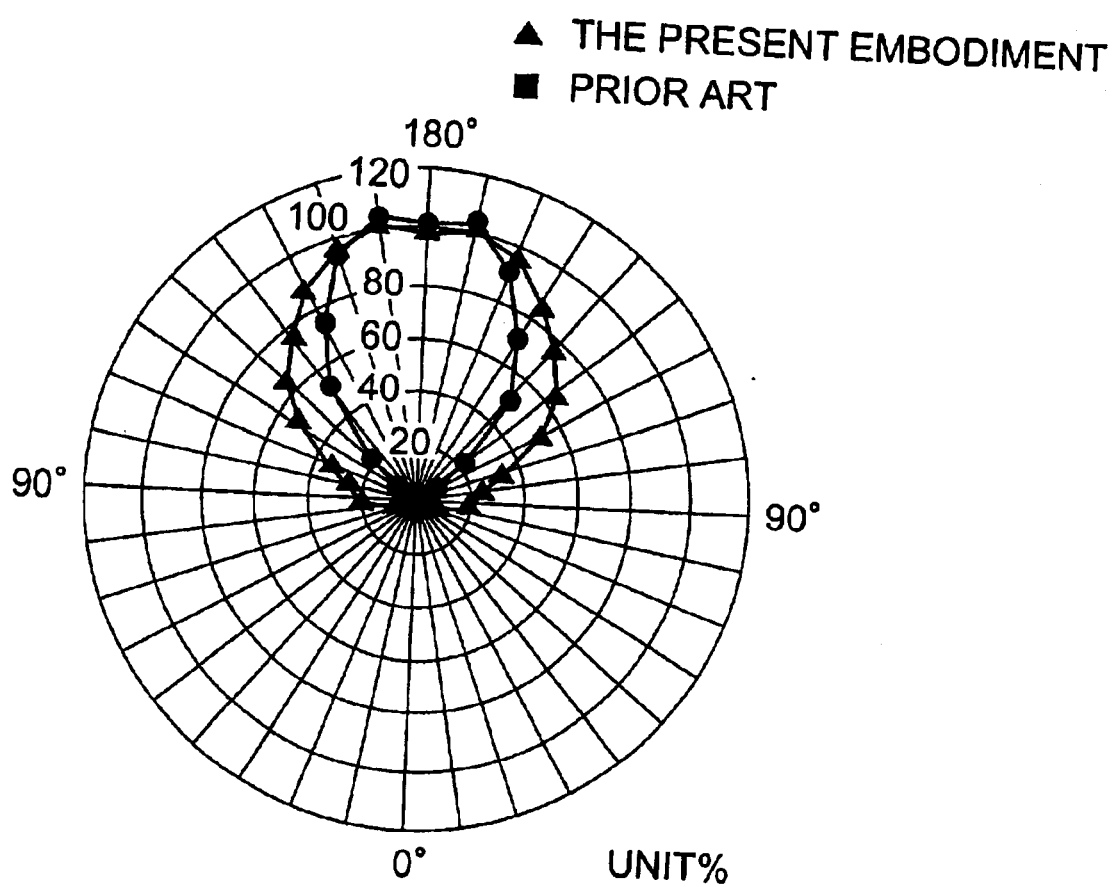
FIG. 4 is a view comparing light distribution data as the entire lighting apparatus having the fluorescent lamp unit attached thereto between the embodiment and the prior art compact fluorescent lamp unit.

FIG. 4 shows light distribution data as the entire lighting apparatus having the fluorescent lamp unit attached thereto by comparing this embodiment with the prior art compact fluorescent lamp unit. Referring to FIG. 4, taking how the light flux spreads into consideration provided that the illumination intensity (direct illumination intensity) obtained from the center of the lamp unit toward the lower part in the vertical direction is 100%, it can be understood that the light distribution characteristic of the fluorescent lamp unit according to this embodiment is wider.

Moreover, the attachment depth t is t=60 mm in this embodiment whereas t=175 mm in the prior art compact fluorescent lamp unit, and the attachment depth in this embodiment is approximately ⅓ of that of the prior art compact fluorescent lamp. In general, the fluorescent lamp unit must have a discharge path length required for obtaining a predetermined light flux, and the discharge path length is substantially equal to a tube length of the glass bulb. The compact fluorescent lamp has a structure, which assures the necessary discharge path length by being bent in the direction of the attachment depth t. In addition, since the lighting circuit is arranged on the bottom 34 of the lighting apparatus, the attachment depth is increased. Incidentally, referring to Table 1, the attachment depth in the prior art circular fluorescent lamp unit (FCL15EX-N) is t=114 mm. That is because the tube outer diameter of the glass bulb in the prior art circular fluorescent lamp is 26 mm, which is larger than the tube outer diameter 16 mm of the glass bulb in the circular fluorescent lamp according to this embodiment.

In regard to the lamp light flux and the lamp efficiency of the fluorescent lamp itself at a temperature of 25° C., the lamp light flux=1220 1 m and the lamp efficiency=67.8 1 m/W in this embodiment, whereas the lamp flux=1100 1 m and the lamp efficiency=59.0 1 m/W in the prior art compact fluorescent lamp unit. Additionally, in the prior art circular fluorescent lamp, the lamp light flux=660 1 m and the lamp efficiency=44.0 1 m/W. Therefore, the circular fluorescent lamp unit according to this embodiment has the lamp efficiency higher than that of the prior art circular fluorescent lamp unit. This is due to the effect obtained by narrowing the tube outer diameter of the glass bulb. However, even if the lamp unit according to this embodiment is compared with the prior art compact fluorescent lamp unit, the higher lamp efficiency (67.8/59.0=1.15-fold) is demonstrated. Incidentally, since the sufficient light flux cannot be obtained when the tube diameter is too small, the tube diameter of 13 to 20 mm is desirable. Furthermore, the ring outer diameter, which is not less than 145 mm, is obtained in order to obtain the sufficient light flux.

On the other hand, in regard to the system wattage consumption and the system efficiency at a temperature of 25° C. as the entire light apparatus including the fluorescent lamp unit and the light circuit, the system wattage consumption=20 W and the system efficiency=61.0 1 m/W in this embodiment, whereas the system wattage consumption=21.5 W and the system efficiency=51.2 1 m/W in the prior art compact fluorescent lamp unit. When comparing in terms of the system efficiency, the system efficiency of this embodiment is 61.0/51.2=1.19-fold of that of the prior art compact fluorescent lamp unit, and the high system efficiency property in this embodiment is further prominent as compared with the lamp efficiency in the lamp unit itself.

Incidentally, although not illustrated in the table in particular, when the compact fluorescent lamp unit (FDL18EX-N) having the lamp wattage of 18 W is substituted by a lighting apparatus using a krypton lamp unit, the attachment depth t is approximately t=90 mm to 160 mm although it depends on design, and it may be closer to that of the lighting apparatus according to this embodiment rather than the compact fluorescent lamp unit in some cases.

However, in case of embedding the apparatus using the krypton lamp unit in a ceiling, since a lamp temperature during lighting increases to approximately 120° C. and the apparatus has high-temperature heat, this apparatus cannot be subjected to the blowing insulation that is generally used. Therefore, a heat insulating material at an installation position must be removed, which considerably deteriorates the warmth retaining property in an installation space. On the contrary, in case of the fluorescent lamp unit according to this embodiment, a glass temperature during lighting is only 55° C. or thereabout. Thus, increase in temperature of the apparatus stays at a value at which attachment on a ceiling surface subjected to the insulation is possible, and the degree of freedom with respect to an installation position of the circular fluorescent lamp unit according to this embodiment is larger than that of the krypton light unit. Moreover, it is often the case that a light source of the down light unit is installed at a relatively high position where replacement of the lamp unit is difficult, the low frequency of replacement is desirable. However, the duration of life of the krypton lamp unit is 2000 hours, and this is extremely shorter than 9000 hours, which is the duration of life of the fluorescent lamp unit according to this embodiment. The circular fluorescent lamp unit according to this embodiment is superior to the krypton lamp unit in terms of the maintenance cost.

On the other hand, the lamp efficiency of the krypton lamp unit is 14.4 1 m/W with the lamp wattage of 57 W, and the lamp efficiency of the circular fluorescent lamp unit according to this embodiment is much higher than that of the krypton lamp unit.

As described above, according to the circular fluorescent lamp unit and the lighting apparatus using this lamp unit of the present invention, it is possible to provide the fluorescent lamp which has the higher light flux and higher efficiency than those of a light source of the prior art down light unit such as the compact fluorescent lamp unit or the krypton light unit and can be attached in a narrower space, and the lighting apparatus using this fluorescent lamp.

What is claimed is:

1. A circular fluorescent lamp unit comprising:
   a glass bulb bent into a ring shape with both ends abutting on each other, said glass bulb having a tube outer diameter set within a range of 13 mm to 20 mm and having a ring outer diameter set within a range of 145 mm to 170 mm;
   mercury and inert gas sealed within said glass bulb;
   electrodes provided at respective ends in an inner space of said glass bulb;
   phosphor powder coated on an inner wall of said glass bulb; and
   a cap having connection pins used for electrically connecting said electrodes in said glass bulb with the outside and being attached so as to cut across said both ends of said glass bulb, wherein said circular fluorescent unit has a lamp wattage which is not greater than 20 W and used for lighting with high frequency which is not less than 10 kHz, said circular fluorescent lamp unit being suitable for illumination in a relatively narrow place with a system efficiency on the order of 61.0 lm/W while generating minimal heat.

2. A lighting apparatus comprising
   a base; and
   a circular fluorescent lamp unit associated with said base, said circular fluorescent lamp unit including
   a glass bulb bent in a ring shape with both ends abutting on each other, said glass bulb having a tube outer diameter set within a range of 13 mm to 20 mm and having a ring outer diameter set within a range of 145 mm to 170 mm,
   mercury and inert gas sealed within said glass bulb,
   electrodes provided at respective ends in an inner spaces of said glass bulb,
   phosphor powder coated on an inner wall of said glass bulb, and
   a cap having connection pins used for electrically connecting said electrodes in said glass bulb with the outside and being attached so as to cut across said both ends of said glass bulb, wherein said circular fluorescent lamp unit has a lamp wattage not greater than 20 W and used for lighting with a high frequency which is not less than 10 kHz, said lighting apparatus being suitable for illumination in a relatively narrow place with a system efficiency on the order of 61.0 lm/W while generating minimal heat.

3. The lighting apparatus according to claim 2, further comprising a lighting circuit for said circular fluorescent lamp unit.

4. The lighting apparatus according to claim 3, wherein said lighting circuit is arranged inside the ring shape of said circular fluorescent lamp unit.

5. A circular fluorescent lamp unit comprising:

a glass bulb bent into a ring shape with both ends abutting on each other, said glass bulb having a tube outer diameter set within a range of 13 mm to 20 mm and having a ring outer diameter set within a range of 145 mm to 170 mm;

mercury and inert gas sealed within said glass bulb;

electrodes provided at respective ends in an inner space of said glass bulb;

phosphor powder coated on an inner wall of said glass bulb; and a cap having connection pins used for electrically connecting said electrodes in said glass bulb with the outside and being attached so as to cut across said both ends of said glass bulb, wherein lamp wattage of said circular fluorescent lamp unit is not more than 20 W, and wherein said circular fluorescent lamp unit is used for lighting with a high frequency which is not less than 10 kHz, said circular fluorescent lamp unit being suitable for illumination in a relatively narrow place with a system efficiency on the order of 61.0 lm/W while generating minimal heat.

* * * * *